United States Patent [19]

Hirashima

[11] 4,202,012

[45] May 6, 1980

[54] SAMPLING CLOCK REPRODUCING DEVICE

[75] Inventor: Masayoshi Hirashima, Ibaraki, Japan

[73] Assignee: Matsushita Electric Industrial Co., Ltd., Ibaraki, Japan

[21] Appl. No.: 882,087

[22] Filed: Mar. 1, 1978

[30] Foreign Application Priority Data

Mar. 15, 1977 [JP] Japan .................................. 52-28840
May 20, 1977 [JP] Japan .................................. 52-59262

[51] Int. Cl.² .............................................. H04N 7/08
[52] U.S. Cl. ...................................... 358/147; 358/20; 358/138
[58] Field of Search ................... 358/146, 147, 19, 20, 358/138, 149; 307/239, 240, 247 R, 269; 328/91

[56] References Cited

U.S. PATENT DOCUMENTS

| | | | |
|---|---|---|---|
| 3,507,985 | 4/1970 | Brevkink et al. ..................... | 358/147 |
| 3,576,391 | 4/1971 | Houghton ............................. | 358/147 |
| 3,801,917 | 4/1974 | Weinstein ............................. | 307/269 |

OTHER PUBLICATIONS

Darrington—Wireless World Teletext Decoder—Wireless World—vol. 81 #1479 pp. 498-504 Nov. 1975.

*Primary Examiner*—Robert L. Griffin
*Assistant Examiner*—Joseph A. Orsino, Jr.
*Attorney, Agent, or Firm*—Burgess, Ryan and Wayne

[57] ABSTRACT

A sampling clock reproducing device wherein binary coded signals representative of letters or other patterns which are superimposed on the television signal and the pilot signal superimposed before the binary coded signals in order to indicate the phase thereof are received, and the phase of the pilot signal is detected whereby clock pulses for sampling the binary coded signals are reproduced.

5 Claims, 8 Drawing Figures

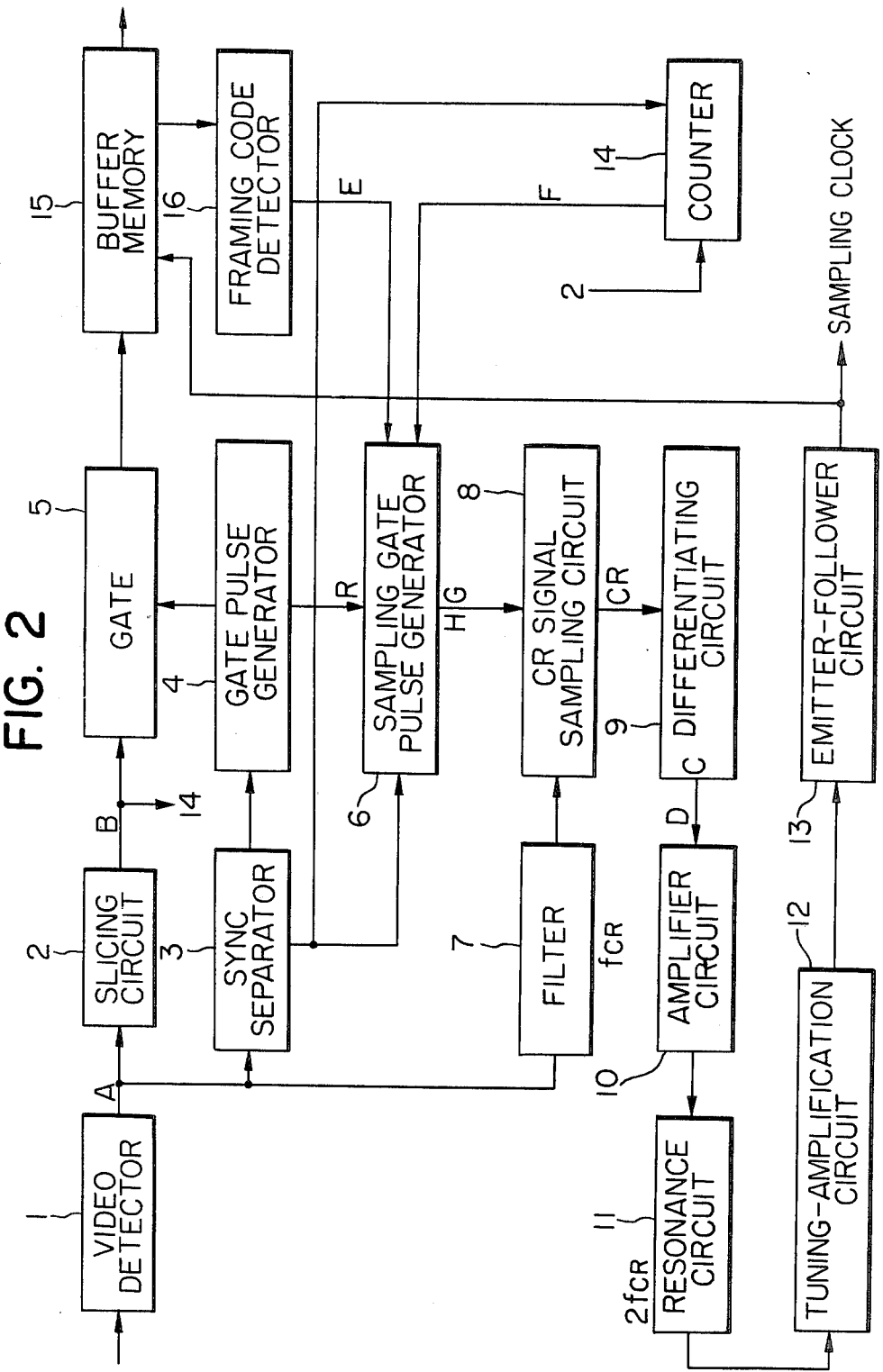

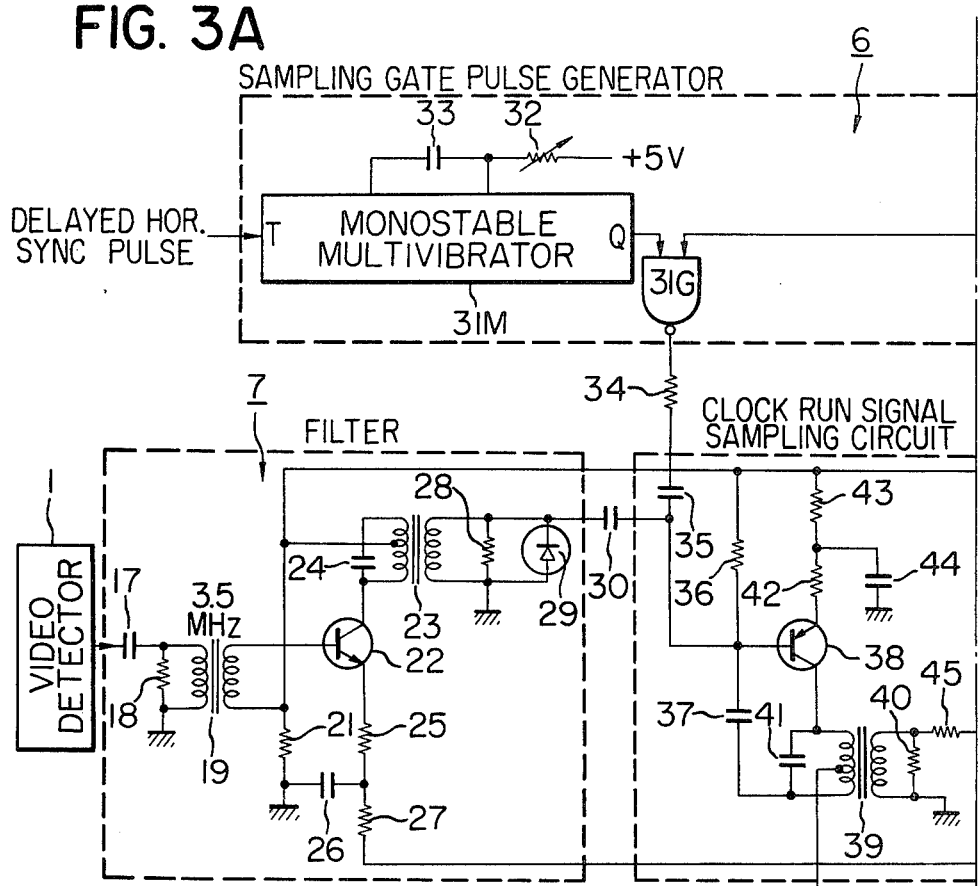
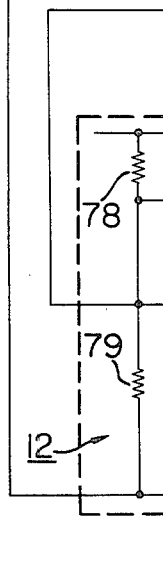
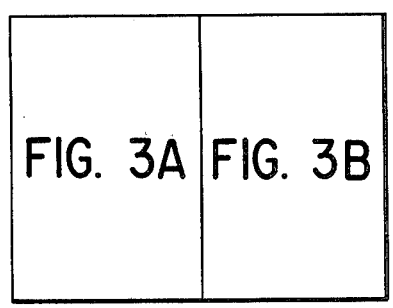

SAMPLING CLOCK REPRODUCING DEVICE

BACKGROUND OF THE INVENTION

The present invention relates to a system for transmitting and receiving binary coded signals representative of letters or patterns superimposed on the television signal during the vertical retrace time intervals, and more particularly a sampling clock reproducing device for a receiver for reproducing good sampling clock pulses when the phase of each bit of said signals is determined independently of the color subcarrier of the television signal.

One of the systems of the type described above is an information transmission system called CEEFAX which has been used in England. The binary coded signals are superimposed on the television signal at the 17H-th and the 18H-th and 330H-th and 331H-th during the vertical retrace intervals (One frame being 625H). One character consists of 8-bits and other control codes also consist of 8-bits. The 8-bit pilot signal called clock run is inserted prior to the binary coded signals. The width of one bit of the clock run signal is one period of $2f_{CR}$ (=6.9375 MHz), and this is so set that 6.9375 MHz=444×fH which is independent of the color subcarrier $f_{sc}$. This phase is arbitrarily selected. The receiver, based on this clock run signal, reproduces sampling clocks for sampling the coded signals. The repetition rate of the binary coded signals (which is defined by the repetition rate of the clock signal) is set to twice as high as the repetition rate of the pulses of the pilot signal. The reason why the repetition rate of the pulses of the pilot signal is set low is that even when there exists waveform distortion the lower the repetition rate the more correctly the receiver may reproduce.

SUMMARY OF THE INVENTION

Therefore one of the objects of the present invention is to provide a sampling clock reproducing device wherein when the television signal is received and a character generator is operated by the binary coded signals for displaying on the screen of a television receiver letters or patterns, in order to derive the binary coded signals with the television receiver, the clock run signal which is the pilot signal is correctly sampled so that clock pulses for sampling the binary coded signals may be reproduced, and stable reception may be obtained even in weak field intensity areas.

Another object of the present invention is to provide a sampling clock reproducing device wherein the beginning of a sampling gate pulse for sampling the clock run signal is determined by a waveform which is derived by delaying a horizontal sync signal and the end of the sampling gate pulse is determined by a waveform generated when a predetermined number of clock run signals has been counted, so that extremely precise clock run signal sampling may be effected.

A further object of the present invention is to provide a sampling clock reproducing device wherein the end of the sampling gate pulse is located prior to the last one period of the clock run signal so that wave distortion which tends to occur at the last one period of the clock run signal may not be picked up and even when the last one period of the clock run signal is not received due to noise or the like the last one period still remains, whereby the whole period number of the clock run signal received is equal to normal time.

A further object of the present invention is to provide a sampling clock reproducing device wherein a monostable multivibrator wherein the position of the end is determined a little after the position of the end of the sampling gate pulse is included in a sampling gate pulse generator and when some of the number of the CR signal are lost due to noise and when the arrival of the signal informing the position of the end of the sampling gate pulse from a counter counting the number of the clock run pulse is delayed, the sampling gate pulse may be terminated by a monostable multivibrator prior to the binary coded signals, whereby the binary coded signals succeeding the clock run signal may not be passed.

A yet further object of the present invention is to provide a sampling clock reproducing device wherein a framing signal following the clock run signal is detected, the detection output terminates the sampling gate pulse and a counter of the clock run signal and the monostable multivibrator are used when the sampling gate pulse is not terminated, whereby a triple safety may be obtained.

A still further object of the present invention is to provide a sampling clock producing device wherein the clock run signal is sampled and differentiated into a double frequency and sampling clocks which are equal in position to the binary coded signals may have a greater output by a relatively simple and safe circuit.

BRIEF DESCRIPTION OF THE DRAWINGS

FIG. 2 is a block diagram of the first embodiment;

FIGS. 3, 3A and 3B are detailed circuit diagrams illustrating major components thereof.

DESCRIPTION OF THE PREFERRED EMBODIMENTS

Figure 1:
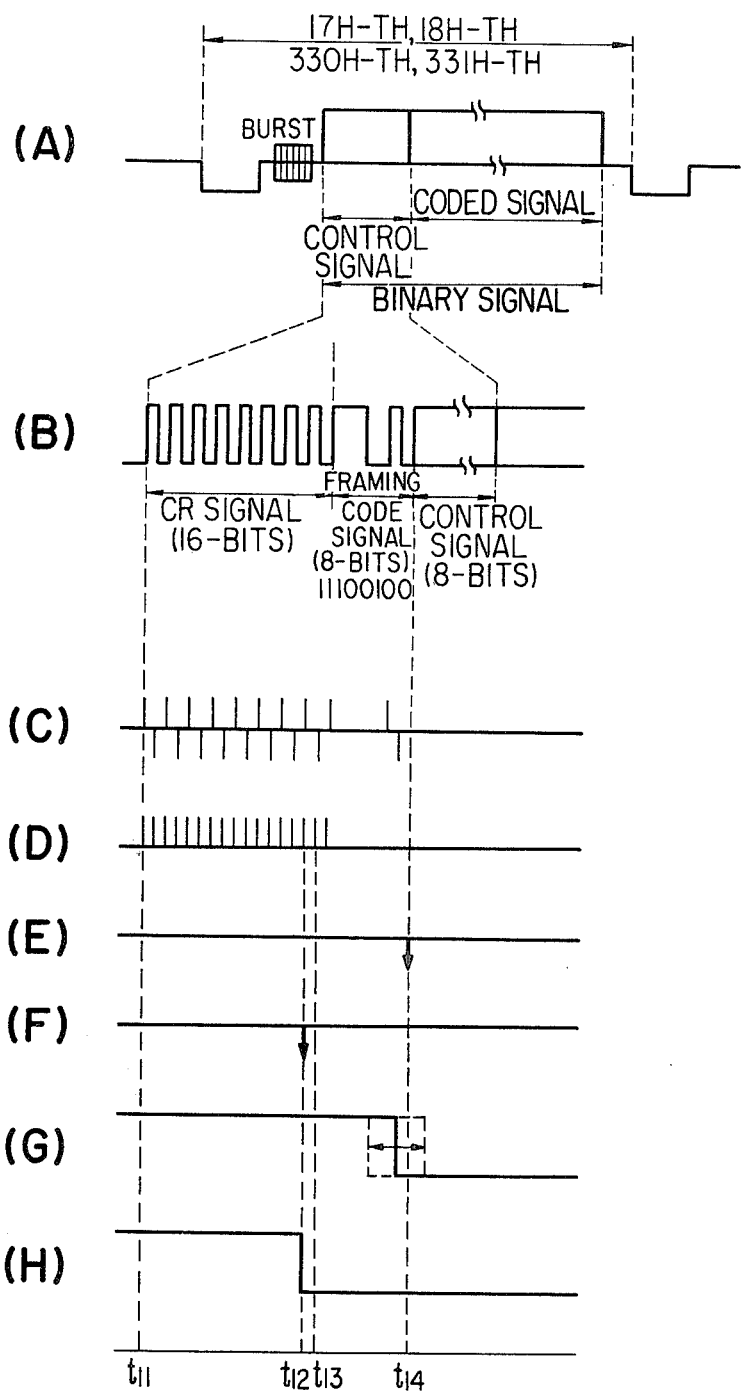
FIG. 1 shows waveforms used for the explanation of the mode of operation of the first embodiment of a sampling clock reproducing device in accordance with the present invention.
Figure 3B:
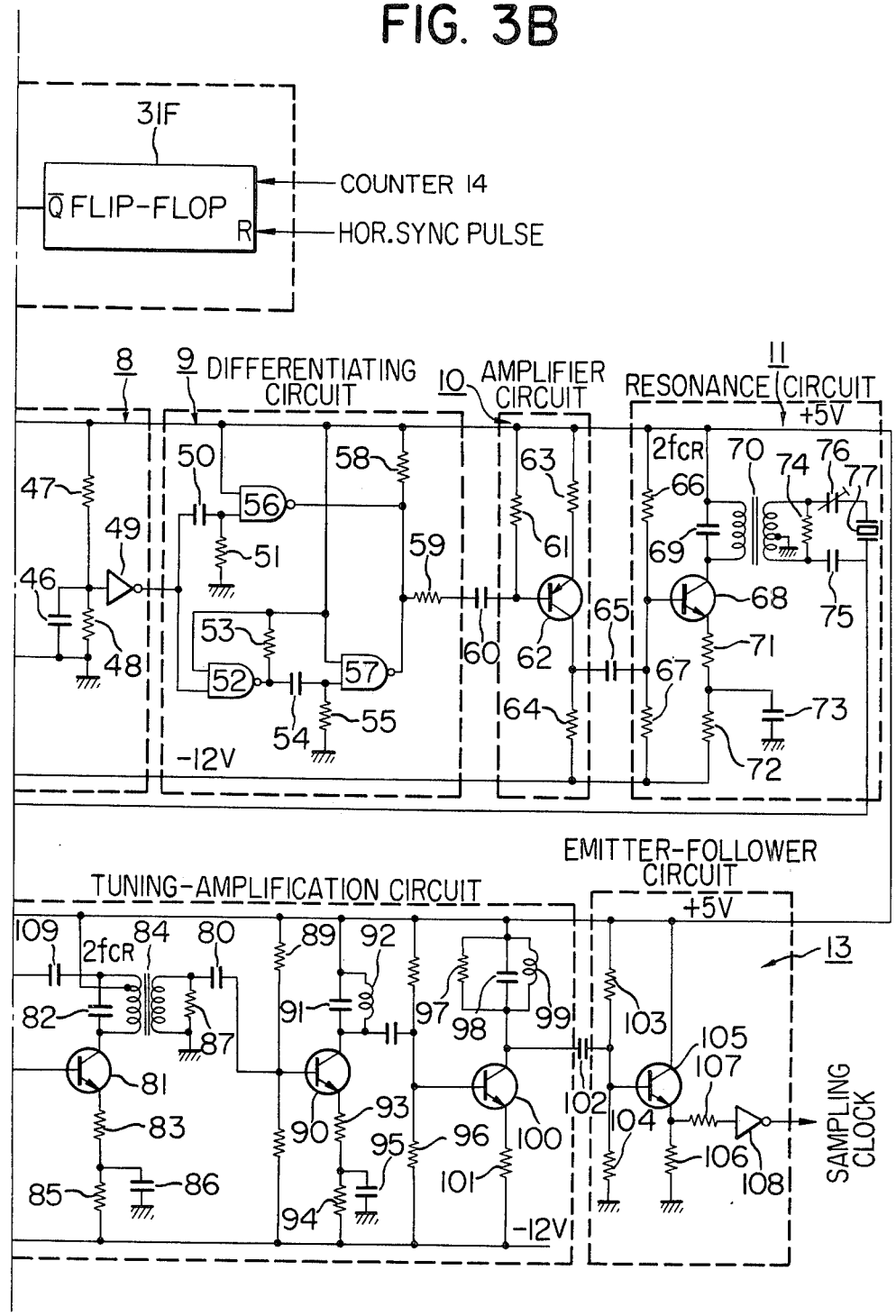

First Embodiment, FIGS. 1, 2 and 3

FIG. 1 shows various waveforms used for the explanation of the mode of operation of a sampling clock regenerating device in accordance with the present invention, and FIG. 1(A) shows binary coded signals transmitted between the 17H-th and 18H-th and 330H-th and 331H-th in the vertical retrace time intervals in an information transmission system called CEEFAX which has been used in England. One character consists of 8 bits, and other control codes also of 8 bits. As shown in FIG. 1(B), 16-bit pilot signal called the clock run signal appears prior to the coded signals, and the pulse width is equal to $\frac{1}{2}f_{CR}=6.9375$ MHz=444×fH. The clock run signal is independent of the color subcarrier $f_{sc}$, and its phase is arbitrarily selected. At the receiving end, sampling clocks for sampling the succeeding coded signals are generated based on the clock run signal.

The repetition rate of the binary coded signals (in terms of the repetition rate of the clock signals for binary coded signals) is equal to twice the repetition rate of the pulses of the pilot signal. The reason why the repetition frequency of the pulses of the pilot signal is low is that the lower the repetition rate, the more correctly the signals may be reproduced even though some waveform distortions are involved.

Referring to FIGS. 2 and 3, the output (baseband) from a video detector 1 of a television receiver is converted by a slicing circuit 2 into binary coded signals as shown in FIG. 1(B). In response to the vertical and horizontal sync signals in the output from a sync separator 3, a gate pulse generator 4 generates gate pulses required for sampling the 17H-th and 18H-th (and the 330H-th and 331H-th, but for the sake of explanation only the 17H-th and 18H-th will be described hereinafter) upon which are superposed the coded signals. In response to the gate pulses a gate 5 derives only the 17H-th and 18H-th in the output from the slicing circuit 2 and transfers them into a buffer memory 15. A sampling gate pulse generator 6 generates a sampling gate pulse signal with a predetermined pulse width required for sampling only the clock run signal and transmits the sampling gate pulse to a clock run signal sampling circuit 8. The clock run signal is essential for reading out the succeeding binary coded signals. If the clock run signal cannot be sampled correctly, the succeeding binary coded signals cannot be derived so that even when an antenna is receiving the television signal, no letter or pattern may be displayed on the screen. The correct recovery of the clock run signal is therefore especially important in a low field intensity area. The horizontal sync signal is so delayed that the leading edge of the sampling gate pulse rises after the burst signal and shortly before the start of the clock run signal. The trailing edge of the sampling gate pulse is determined in response to the output pulse from a counter 14 [See FIG. 1(F)]. That is, the counter 14 counts the outputs from the slicing circuit 2. At $t_{12}$ when the counter 14 has counted seven or eight leading edges of the pulses in the clock run signal, it generates a detection signal as shown in FIG. 1(F) so that the sampling gate pulse from the sampling gate pulse generator 6 falls as shown in FIG. 1(H), whereby only the clock run signal may be correctly sampled. Since all of the trailing edges of the pulses in the clock run signal are not counted and because the counting is completed before the last pulse appears, the waveform distortion in the last cycle may be avoided so that only the clock run pulses with high quality may be sampled. Furthermore, even when the first clock run pulse has been failed to be counted, the counter 14 may count the last clock run pulse so that the number of clock run pulses counted by the counter 14 remains unchanged.

If the counter 14 fails to count some of the clock run pulses due to noise, it cannot generate the signal F even after the clock run signal has disappeared. That is, the counter 14 keeps counting the framing code signal following the clock run signal and even the binary coded signal succeeding the framing code signal so that an erratic operation results. In order to prevent the counter 14 from counting the binary coded signals a monostable multivibrator 31M is incorporated within the sampling gate pulse generator 6. The time constant of this multivibrator 31M which is dependent upon the values of a capacitor 33 and a variable resistor 32 is so set that the trailing edge of the output pulse from the multivibrator may appear after the trailing edge ($t_{12}$) of the waveform H but before the leading edge ($t_{14}$) of the binary coded signal. Therefore even when the trailing edge of the waveform H is delayed, the counter 14 may be stopped in response to the trailing edge of the waveform G.

Furthermore, due to temperature variation the trailing edge of the waveform G is shifted as indicated by the broken lines in FIG. 1(G). The forward shift presents no problem, but the backward shift into the binary coded signal will cause erratic operation. Therefore a framing code detector 16 is so arranged that when and only when the framing code signal inserted between $t_{13}$ and $t_{14}$ is "1 1 1 0 0 1 0 0", the sampling gate pulse generator 6 generates a sampling gate pulse shown in FIG. 1(E), and applies it to the sampling gate pulse generator 6. The framing pulse E sets a flip-flop 31F in the sampling gate pulse generator 6, and the $\overline{Q}$ output from the flip-flop 31F is used to gate the output from the monostable multivibrator 31M at a NAND gate 31G. Then, when the trailing edge of the output pulse from the monostable multivibrator 31M is shifted behind $t_{14}$, the output from the NAND gate 31G terminates at $t_{14}$. The flip-flop 31F is reset in response to the horizontal sync signal. The sampling gate pulse from the sampling gate pulse generator 6 has its DC component cut off through a resistor 34 and a capacitor 35 and is applied to the base of a transistor 38 in the clock run signal sampling circuit 8.

As described above, an erratic operation of the counter 14 is safeguarded by the monostable multivibrator 31M, an erratic operation of the multivibrator 31M in turn is safeguarded by the framing code detector 16. Thus, triple safety means is provided so that the clock run signal may be correctly and positively sampled.

A filter 7 which is of the conventional type as shown in FIG. 3 filters $f_{CR}$ or approximately 3.5 MHz ($=\frac{1}{2} \times 6.9375$ MHz). As described elsewhere, the width of one bit of the coded signals is 1/6.9375 MHz=144 nanoseconds, and the maximum frequency is approximately 3.5 MHz when "0" and "1" appear alternately and is equal to the frequency $f_{CR}$ of the clock run signal. That is, the filter 7 passes 3.5 MHz of the clock run signal and other signals. In response to the sampling gate pulse, a clock run signal sampling circuit 8 samples only the clock run signal. The sampled clock run signal is differentiated by a differentiating circuit 9, and the negative spikes [See FIG. 1(C)] are inverted and added to the positive spikes as shown in FIG. 1(D). Thus the signal of 6.9375 MHz is generated. After the signal D has been amplified by an amplifier circuit 10, it is applied to a resonance circuit 11 including a quartz resonator so that the signal may be dampened. The output from the resonance circuit 11 is amplified by a tuning-amplification circuit 12 so that the sampling clocks of $2f_{CR}$ which is the same with the frequency of the coded signals may be generated at least during the 17H-th and 18H-th. Thereafter the sampling clocks are changed in level by an emitter-follower circuit 13. In response to the sampling clock the buffer memory 15 temporarily stores the output or the binary coded signals from the gate 5.

Next referring particularly to FIG. 3, the major components of the first embodiment will be described. 17 and a transformer 19 form a resonance circuit of 3.5 MHz. 18 is a damping resistor; 20 and 21, base bias resistors for a transistor 22; 22 is the transistor for amplification; 23, a load of the transistor 22 or a transformer which resonates at 3.5 MHz; 24, a resonance capacitor; 25, a feedback resistor; 27, a DC feedback resistor; 26, a bypass capacitor; 28, a damping resistor; 29, a diode for limiting the amplitude; 30, a coupling capacitor. 17–19 constitute the filter circuit 7 and an amplifier circuit.

Meanwhile, 31 is a monostable multivibrator which consists of for example an integrated circuit element SN74121. As shown in FIG. 1(G), the output from the multivibrator 31M appears prior to the appearance of the clock run signal but after the color burst and continues for a pulse width which is dependent upon the values of the resistor 32 and the capacitor 33. When the output from the counter 14 shown in FIG. 1(F) is for instance used as a clear pulse, the waveform shown in FIG. 1(H) is cleared at $t_{12}$ so that the sampling of the succeeding signals which are not 3.5 MHz such as the framing signal by the transistor 38 may be avoided.

34 is an impedance matching resistor; 35, a DC stopping capacitor. In this circuit, a +5 V power source for operating a TTL level IC and a −12 V power source for operating transistors are used, a PNP transistor 36 is used. The negative polarity output from the gate 31G which is opposite in polarity to the waveforms shown in FIGS. 1(G) and (H) is used. The transistor 38 is in the turned-on condition for the transmission and amplification of the clock run signal only between G and H.

39 is a resonance transformer of 3.5 MHz; 41, a resonance capacitor; 37, a neutralizing capacitor; 42, a resistor having a low value; 43, a DC feedback resistor; 44, a bypass capacitor; 40, a damping resistor; 45, an impedance matching resistor; 46, a DC stopping capacitor; 47 and 48, bias resistors so provided that the output from an inverter 49 may include a 3.5 MHz component with a duty ratio of 50%.

50 and 51 are a differentiating circuit. Only the positive polarity pulses are inverted by NAND gate 56. NAND gate 52 inverts the output from 49, and the inverted output is differentiated by a capacitor 54 and a resistor 55 so that only the pulses in the positive polarity are derived and inverted by NAND gate 57. The waveform derived by the formation of wired OR of the outputs from NAND gates 56 and 57 are opposite in polarity to the waveform shown in FIG. 1(D). Here 52, 56 and 57 are open collector type NAND gates, and 53 and 58 are resistors for delivering the collector currents to said gates.

59 is an impedance matching resistor; 60, a DC stopping capacitor; 61, a resistor for giving leak bias to the base of a transistor; 62, the waveform shown in FIG. 1(D) appearing at the collector of the transistor 62; 63, an emitter resistor of the transistor 52; and 64 is a load resistor.

65 is a coupling capacitor; 66 and 67 are resistors for biasing the base of a transistor 68; 69 is a tuning capacitor; 70 is a tuning transformer with a resonance frequency of $2f_{CR}=6.9375$ MHz. The frequency of the waveform shown in FIG. 1(D) is twice $f_{CR}$ as the result of the differentiation of 3.5 MHz that is $2f_{CR}=6.9375$ MHz. Therefore the tuning circuit is tuned to the frequency of D. 71 is a resistor; 72 is a DC feedback resistor; 73 is a bypass capacitor; 76 is a trimmer capacitor; 74 is a damping resistor; 75 is a capacitor; 77 is a crystal resonator. With these, 70, 75 and 76 form a resonance circuit with a high Q so that the damping oscillation of $2f_{CR}=6.9375$ MHz is produced. The oscillation is continued after $t_{12}$ shown in FIG. 1. 76 is a fine tuning capacitor; 70 is a variable transformer; and 70 and 76 adjust the damping oscillation.

78 and 79 are base bias resistors for a transistor 81. The transistor 81 is a transistor for amplification. A transformer 84 and a capacitor 82 resonate at $2f_{CR}=6.9375$ MHz, whereby the damping oscillation is amplified. 83 is a resistor having a low value; 85 is a DC feedback resistor; 86 is a bypass capacitor; 87 is a damping resistor; 88 is a coupling capacitor. Up to a resistor 101 are connected three stages of amplification circuit resonating at $2f_{CR}=6.9375$ MHz. And because of their amplification and limiting operations, sampling clocks consisting of a continuous waveform of $2f_{CR}=6.9375$ MHz are produced.

102 is a coupling capacitor; 103 and 104 are base bias resistors for a transistor 105; 106 is an emitter resistor; 107 is a matching resistor for TTL level circuits; the output from an inverter 108 is a sampling clock of $2f_{CR}=6.9375$ MHz. The phase precisely coincide with the phase of the coded signals after $t_{12}$. The phase difference between them is circuitly determined. Therefore when some delay is made so that the phase of the sampling clock may be centered between the bits of the coded signals, the received coded signals may be correctly stored in the buffer memory 15. The contents on the buffer memory 15 is transferred to a main memory by a suitable means.

According to the experiments made by the inventors, when a circuit constant is suitably selected, the input to the transistor 81; that is the output from the resonance circuit including the crystal resonator 77 resonating at $2f_{CR}=6.9375$ MHz is in complete synchronism with the transmitted signal from the 12th or 13th bit of the clock run signal. With the pulses shown in FIG. 1(D), the correct sampling pulses are derived from the 12th or 13th. Therefore the flip-flop 31F is cleared at $t_{12}$ which corresponds to 15th so that the width of the sampling pulse for sampling the clock run signal is reduced. However, no problem arises at all. When the width of the sampling pulse G or H is too wide, the 3.5 MHz component in the coded signals appears at the output of the transistor 38 in the gate 8 at $t_{12}$ or thereafter and is transmitted to the resonance circuit 11. As a result, trigger pulses are applied to the crystal resonator for many times so that the phase and frequency of the output are disturbed. In the CEEFAX system described above, the framing code pulses "1 1 1 0 0 1 0 0" always follow the clock run signal. Therefore these pulses are detected at $t_{14}$ to clear the flip-flop 31F. When the counter 14 is so constructed and arranged as to be cleared at the leading edge of the sampling pulse G or H, the space to the clock run signal is reduced so that no erratic operation occurs. Even if one bit input to the counter 14 is increased or decreased, there may be a sufficient margin. Regardless of the fact that the flip-flop 31F is cleared many times in response to the output from the counter 14 after $t_{14}$, the flip-flop 31F remains cleared until the next horizontal sync signal appears.

Figure 4A:
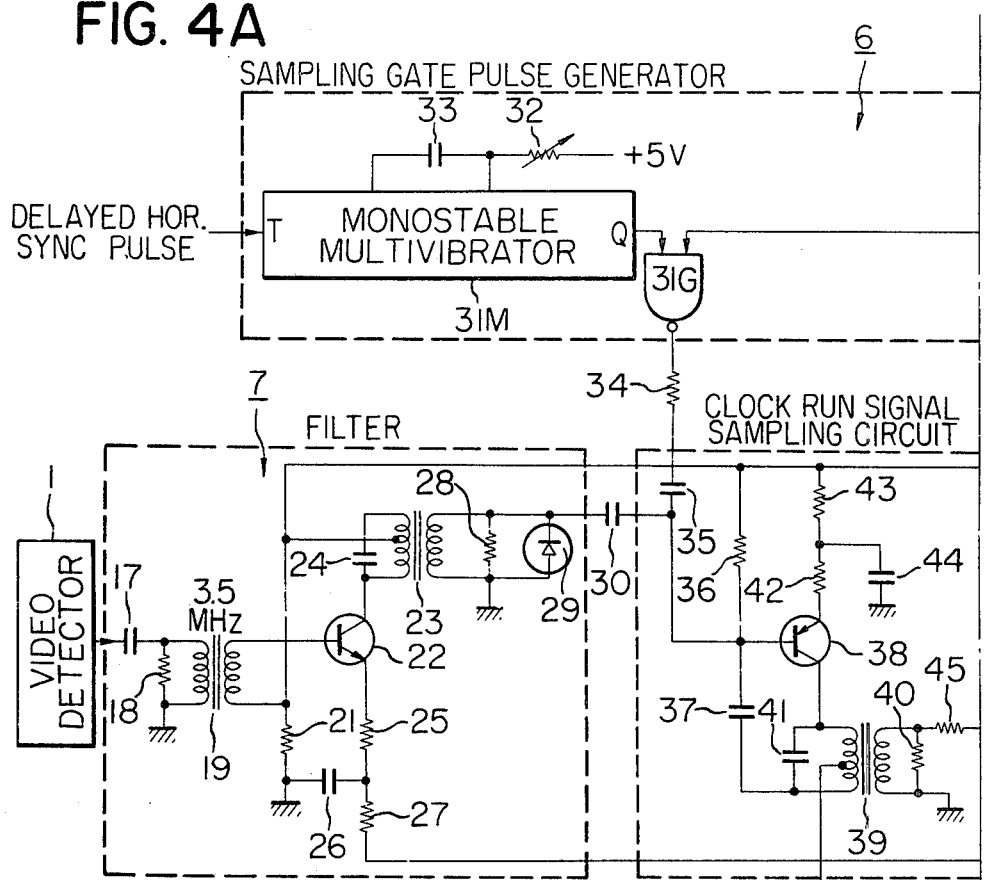
FIGS. 4, 4A and 4B are detailed circuit diagrams of a second embodiment of the present invention illustrating major components thereof.
Figure 4:
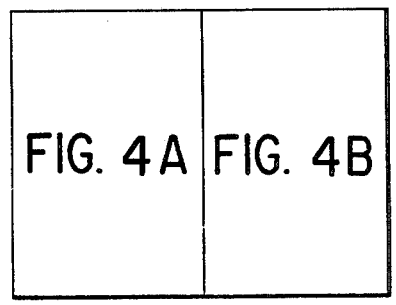
Figure 4B:
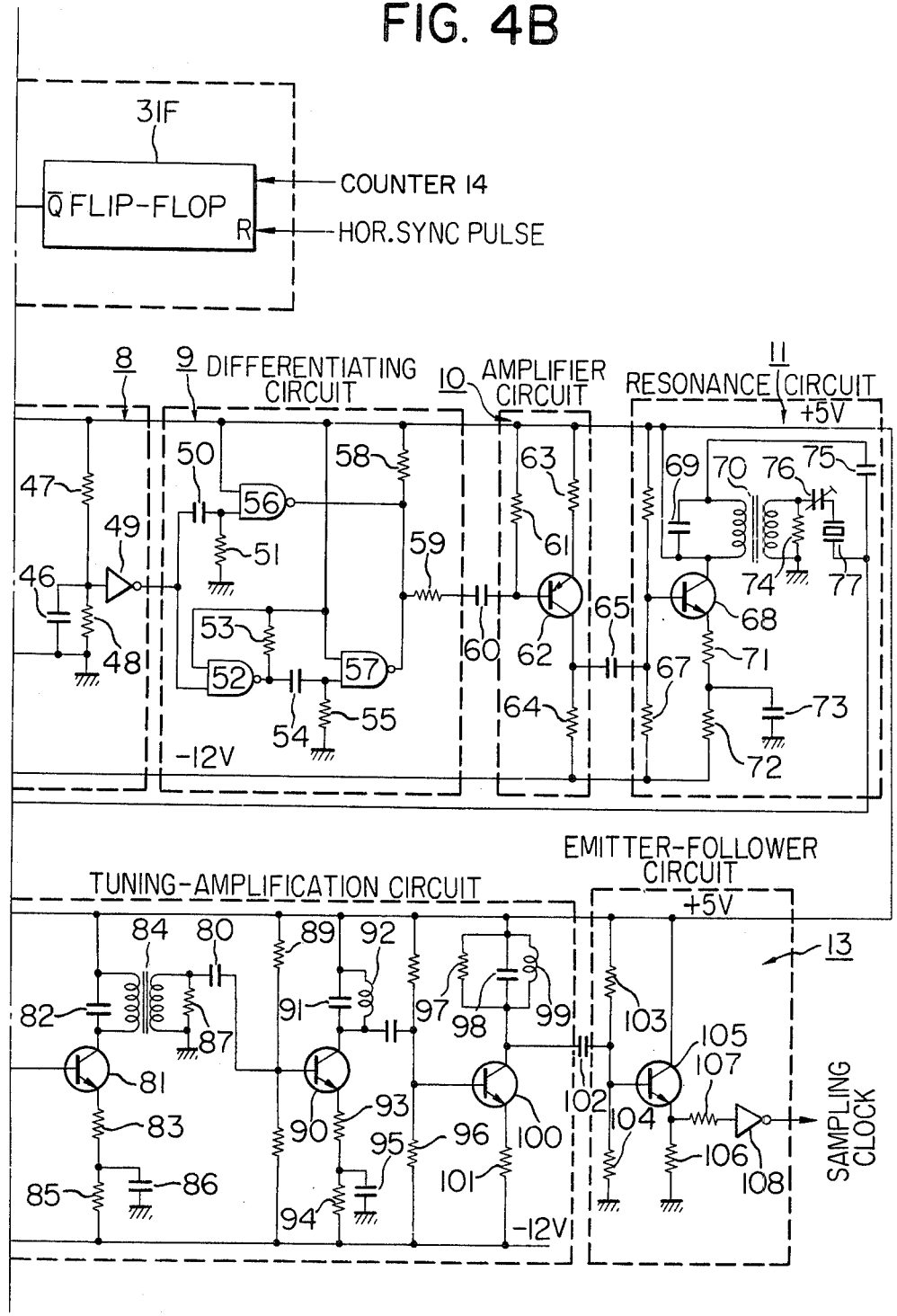

Second Embodiment, FIG. 4

In FIG. 4 there is shown another embodiment of the present invention. In this embodiment, the resonance circuit 11 shown in FIG. 3 is an oscillation circuit 11. One junction point between a tuning capacitor 69 and a tuning transformer 70 is connected to a power line while the other junction point between them is connected through a capacitor 75 which is a feedback capacitor to the base of a transistor 81. The collector of the transistor 68 is connected to the midpoint of the winding of the tuning transformer 70. The junction point between a crystal resonator 77 and a capacitor 75 is connected to the base of the transistor 81. One junction point between the capacitor 82 and the primary of the transformer 84 is connected to the supply line. 76 is a trimmer capacitor for the fine adjustment of frequency, but sometimes the elimination of this capacitor gives better results. Instead of the crystal oscillator 77, an element having a stable oscillation frequency may be used. A transformer and a capacitor 82 resonate at $2f_{CR}=6.9375$ MHz. Up to a resistor 101 are connected three circuits which resonate at $2f_{CR}$. Instead of three stages, only one stage may be employed without adversely affecting the operation. The waveform shown in FIG. 1(D) (that is, 6.9375 MHz) is amplified by the amplifier 10 and is applied to the oscillation circuit 11 including a crystal resonator capable of oscillating at $2f_{CR}$ so that the phase (frequency) may be drawn. The phase is drawn not only in the 17H-th and 18H-th but also over the whole H. Even if the performance of the oscillator is not satisfactory the phase is completely drawn during the 17H-th and 18H-th so that the sampling pulses at the same frequency with that of the coded signal may be generated. Thereafter, the level conversion is attained in the emitter-follower circuit 13, and the buffer memory 15 is clocked so that the output from the gate 5; that is, the coded signals are stored temporarily in the buffer memory 15.

According to the experiments conducted by the inventors, when a suitable circuit constant is selected, the phase drawing is effected upon application of ten pulses shown in FIG. 1(D) to the input of the transistor 68 so that more than 5-bits in the clock signal are enough. Therefore there arises no problem even when $t_{12}$ is considerably shifted forwardly of $t_{13}$ so that the flip flop 31F is set and the width of the sampling gate pulse for sampling the clock run signal is reduced. When the sampling gate pulse G or H is too wide, the 3.5 MHz component in the coded signals at and after $t_{12}$ appears at the output of the transistor 38 in the gate 8 so that the crystal oscillator is triggered many times and consequently the phase and frequency of the output are disturbed. When the counter 14 is so arranged as to be clear at the leading edge of the sampling pulse G or H, the time interval to the clock run signal is narrowed so that no erratic operation due to noise occurs. Even when the input to the counter 14 is increased or decreased by one bit, there is available a sufficient margin. Even when the flip-flop 31F is cleared many times after $t_{12}$ in response to the output from the counter 14, it remains cleared after the next horizontal sync signal appears.

Therefore only the pilot signal such as the clock run signal may be sampled and the sampling clocks in complete synchronism with the pilot signal may be generated. Thus sampling errors may be completely eliminated. Even when the clock run signal is increased or decreased by one or two bits, the correct phase drawing is effected. Furthermore even without the clock run signal, the phase is correctly held during one to two fields, whereby sampling is possible.

What is claimed is:

1. Apparatus for deriving sampling clock signals from a television signal including horizontal sync signals defining corresponding time intervals, vertical sync signals, a predetermined number of pilot signals comprising a group following a particular one of said horizontal sync signals during each field of said television signal, and a group of binary coded signals following each group of said pilot signals and extending over at least two of said time intervals, said binary coded signals having a predetermined phase relationship with said pilot signals, said apparatus comprising:
    a sampling circuit for sampling said pilot signal;
    means for repetitively generating a pilot signal sampling gate pulse whose leading edge is defined by a waveform which is derived by delaying a horizontal sync signal and whose trailing edge is defined by a signal produced when a predetermined number of pilot signals has been counted, said trailing edge of said pilot signal sampling gate pulse occurring prior to the termination of the last of said predetermined number of pilot signals in the corresponding group thereof;
    sampling means for applying said pilot signal sampling gate pulse to said sampling circuit, thereby sampling only said pilot signal; and
    means responsive to the signal derived by said sampling means for generating sampling clock signals for sampling said binary coded signals.

2. Apparatus as set forth in claim 1 wherein said pilot signal sampling gate pulse generating means includes a monostable multivibrator with the position of the trailing edge thereof set a short time after the termination of the last pilot signal of said corresponding group thereof.

3. Apparatus as set forth in claim 1 wherein said television signal includes a coded framing signal inserted between said pilot signal and said binary coded signals, further comprising means responsive to said framing signal for establishing the position of the trailing edge of said pilot signal sampling pulse.

4. Apparatus as set forth in claim 1 wherein said binary coded signals comprise pulses having a repetition rate which is twice the repetition rate of said pilot signal, and includes means for differentiating said pilot signal and for generating therefrom higher frequency pulses at a frequency twice as high as the frequency of the pilot signal, an oscillation circuit including a crystal oscillator, said higher frequency pulses being supplied to said oscillation circuit so that the oscillation thereof may be excited at least for a time when said binary coded signals exist, and means coupled to said oscillation circuit for providing said sampling clock signals.

5. Apparatus as set forth in claim 4 wherein said oscillation circuit is a resonant circuit which resonates at a frequency twice as high as the frequency of said pilot signal, and means for deriving a damped oscillation from said resonant circuit.

* * * * *